(12) United States Patent
Quesada Saborio

(10) Patent No.: US 9,395,004 B1
(45) Date of Patent: Jul. 19, 2016

(54) REFRIGERANT CONTROL VALVES

(71) Applicant: Carlos Quesada Saborio, San José (CR)

(72) Inventor: Carlos Quesada Saborio, San José (CR)

( * ) Notice: Subject to any disclaimer, the term of this patent is extended or adjusted under 35 U.S.C. 154(b) by 332 days.

(21) Appl. No.: 13/898,280

(22) Filed: May 20, 2013

Related U.S. Application Data

(63) Continuation-in-part of application No. 12/924,702, filed on Oct. 1, 2010, now Pat. No. 8,443,838.

(60) Provisional application No. 61/277,988, filed on Oct. 1, 2009, provisional application No. 61/278,269, filed on Oct. 1, 2009, provisional application No. 61/278,503, filed on Oct. 7, 2009.

(51) Int. Cl.
*F16K 13/00* (2006.01)

(52) U.S. Cl.
CPC ........................ *F16K 13/00* (2013.01)

(58) Field of Classification Search
CPC ............. F16K 1/54; F16K 1/52; F16K 1/385; F25B 41/04
USPC ......................................... 137/625.3, 625.37
See application file for complete search history.

(56) References Cited

U.S. PATENT DOCUMENTS

| | | | | |
|---|---|---|---|---|
| 3,990,475 A | * | 11/1976 | Myers | ........................ 137/625.3 |
| 4,349,489 A | | 9/1982 | Gaget | |
| 4,397,331 A | | 8/1983 | Medlar | |
| 4,407,327 A | | 10/1983 | Hanson et al. | |
| 4,634,095 A | * | 1/1987 | Taylor | ........................ 137/625.37 |
| 4,842,018 A | * | 6/1989 | White et al. | ................ 137/625.3 |
| 4,860,993 A | | 8/1989 | Goode | |
| 5,419,531 A | | 5/1995 | Hoehn | |
| 5,964,248 A | * | 10/1999 | Enarson et al. | .......... 137/625.37 |
| 6,250,602 B1 | | 6/2001 | Jansen | |
| 6,637,452 B1 | | 10/2003 | Alman | |
| 6,766,826 B2 | * | 7/2004 | Baumann | .................... 137/625.3 |
| 6,848,670 B2 | | 2/2005 | Haunhorst | |
| 7,448,409 B2 | | 11/2008 | Micheel | |

* cited by examiner

*Primary Examiner* — Eric Keasel

(74) *Attorney, Agent, or Firm* — James Creighton Wray

(57) ABSTRACT

Refrigerant is controlled by primary and secondary metering by main control valves with connections to individual one pass heat transfer circuits. The connections from the main valve radially extend from the valve body. Needles contact upper edges of sloped seats in valve bodies. The needles have sloped conical surfaces which seal the valves and cylindrical bases which seal orifices leading to radially extending individual circuit connectors. Moving the needle opens the valve, metering flow between the cone and the seat and opening and metering flow to partially opened orifices. The needle shape directs the flow through the orifices which are narrow for fluids and wide for vapors. An internal channel in the valve body is opened when the needle is moved to equalize pressure on the needle and the base.

14 Claims, 14 Drawing Sheets

US 9,395,004 B1

REFRIGERANT CONTROL VALVES

This application is a continuation-in-part of application Ser. No. 12/924,702 filed Oct. 1, 2010, which claims the benefit of U.S. Provisional Applications 61/277,988, filed Oct. 1, 2009, 61/278,269, filed Oct. 1, 2009 and 61/278,503, filed Oct. 7, 2009, which are hereby incorporated by reference in their entireties.

BACKGROUND OF THE INVENTION

Summary of the Invention

The invention provides multiple controlled connections to multiple individual single pass circuits in heat exchangers. The connections may number, for example, 20, 30 40, 60 or more. The valve bodies have fine slits for controlling liquid and larger openings for controlling vapors. As an example, the fine slit valve bodies could be used as the condenser output and evaporator inlet. The valve bodies with larger openings could be used at the evaporator outlet and at the condenser input.

The large number of circuits are individually controlled in groups of two to ten, for example, so that the heat exchanger is substantially uniform in temperature. The fan used with the exchanger mixes the temperatures so that the output has a uniform temperature throughout.

These and further and other objects and features of the invention are apparent in the disclosure, which includes the above and ongoing written specification, with the claims and the drawings.

DETAILED DESCRIPTION

Figure 1:
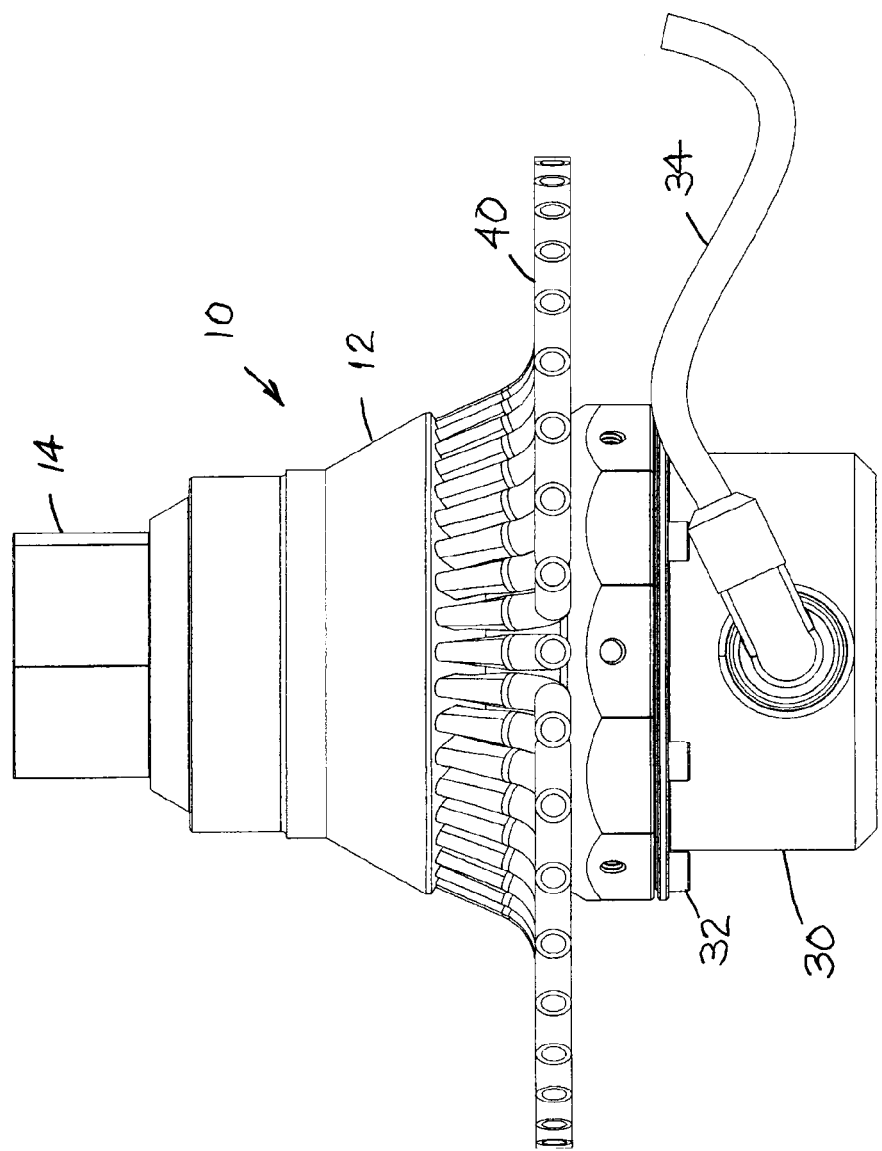
FIGS. 1-3 are a side elevation, a top perspective and a bottom perspective view of a refrigerant control valve with connections for individual heat transfer circuits in a heat exchanger.
Figure 2:
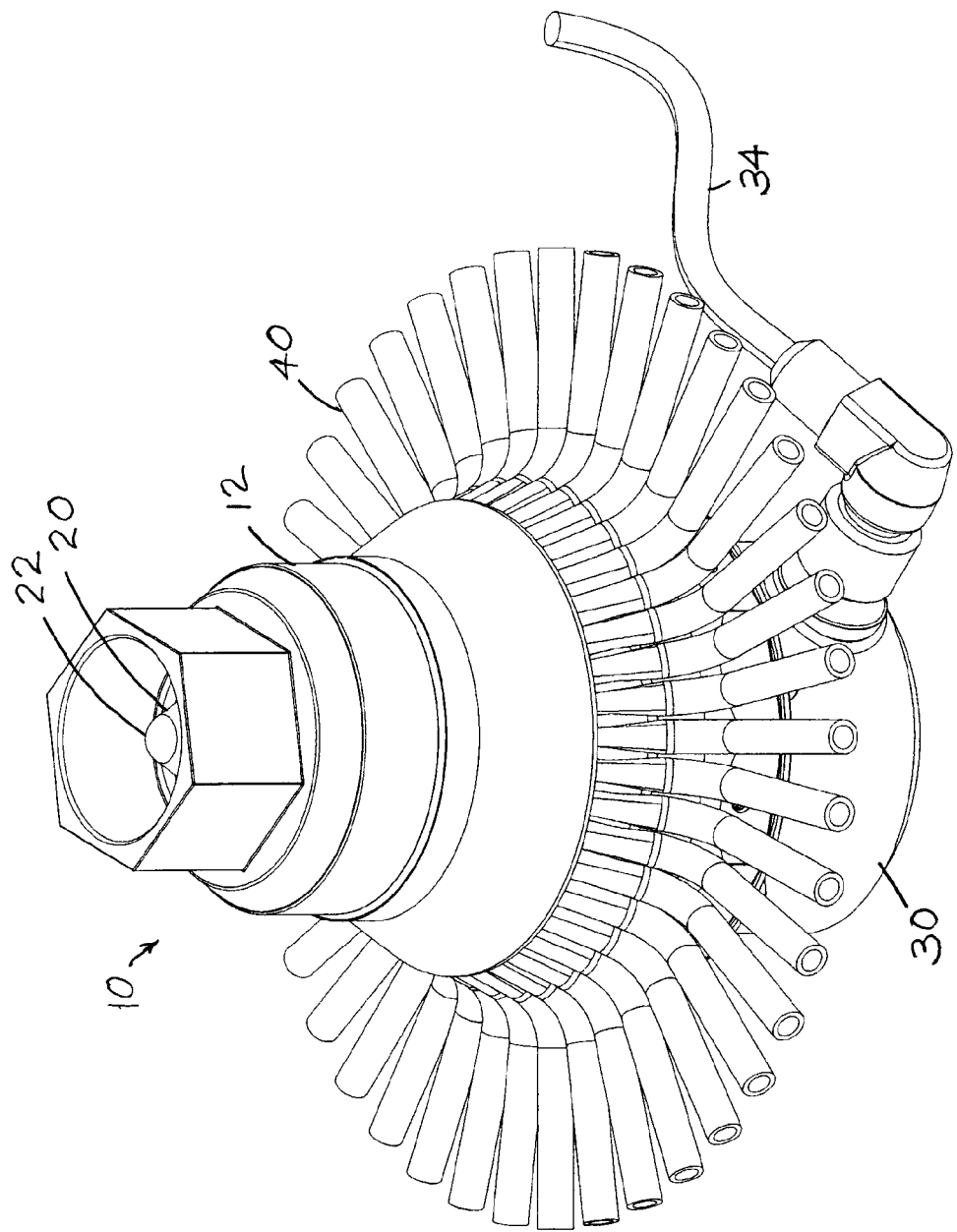
Figure 3:
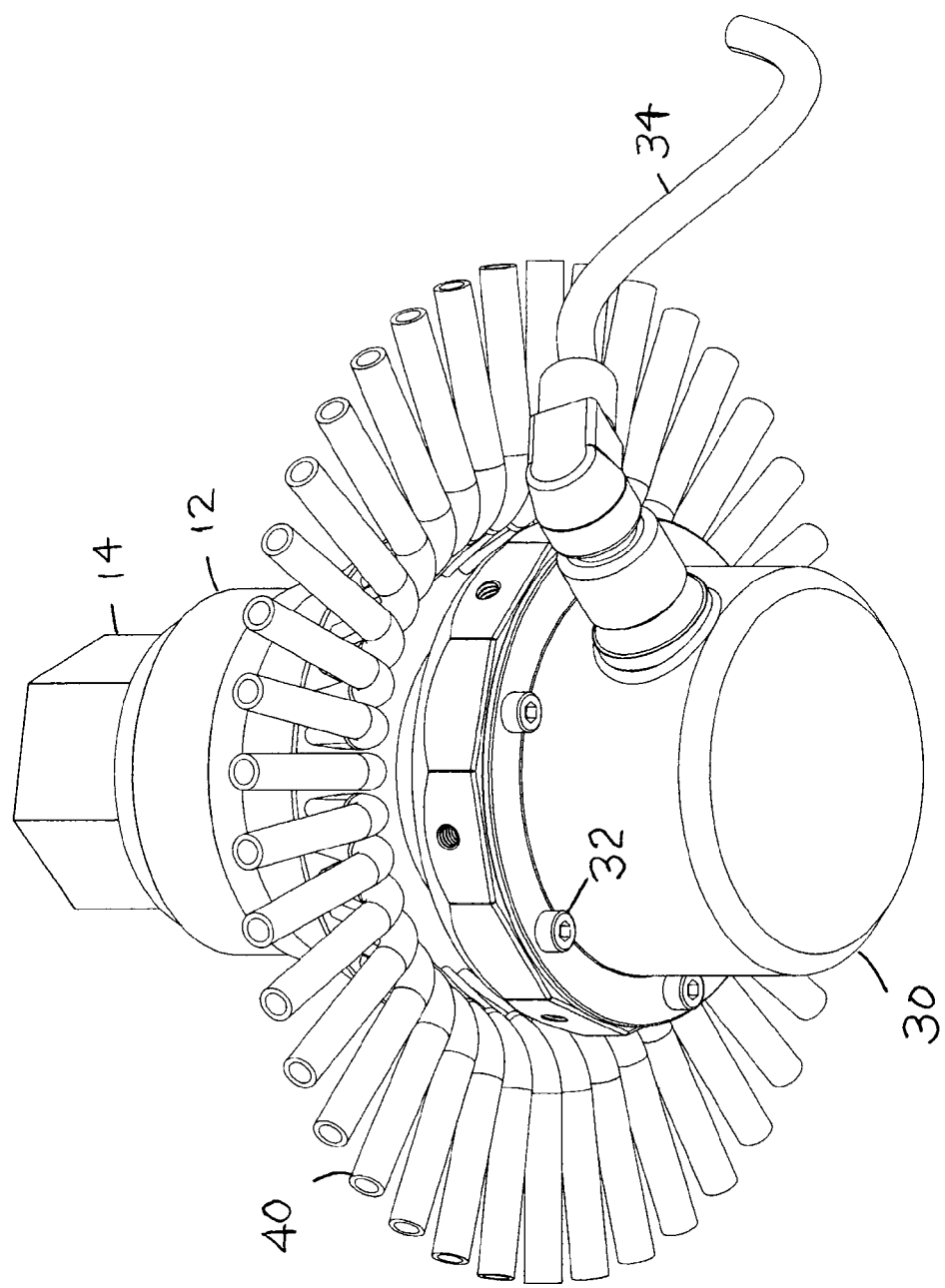

FIGS. 1-3 are a side elevation, a top perspective and a bottom perspective view of a refrigerant control valve with connections for individual heat transfer circuits in a heat exchanger.

Refrigerant main control valve 10 has a valve body 12 with a refrigerant pipe header 14. A conical needle 20 (FIG. 2) has a rounded upper end 22. A base 30 is secured to the bottom of valve body 12 with bolts 32. An electrical line 34 extends from the base. Connectors 40 connect the valve 10 with individual refrigerant circuits.

Figure 6:
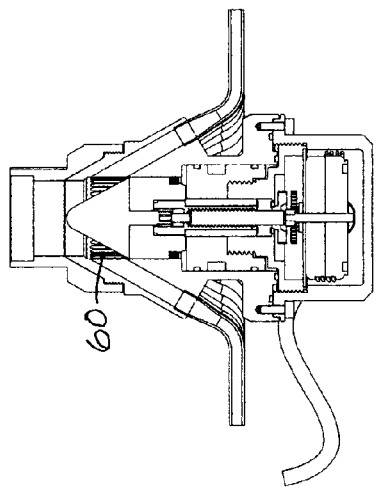
FIGS. 4-6 are closed, metering and fully open cross-sectional views of a phase change vapor control valve of FIGS. 1-3.
Figure 5:
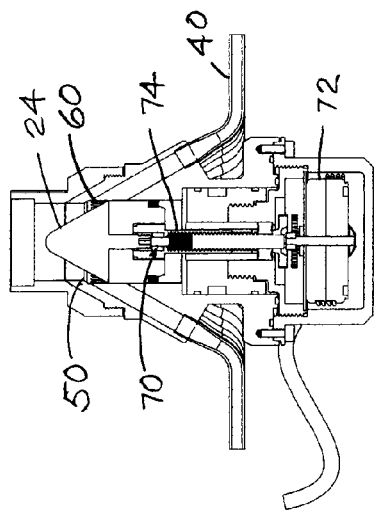
Figure 4:
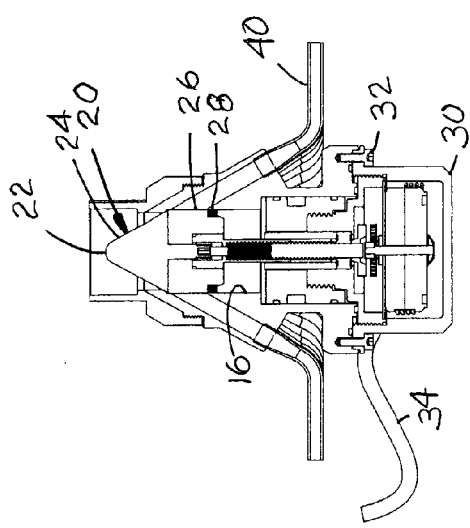

FIGS. 4-6 are closed, metering and fully open cross-sectional views of a phase change vapor control valve of FIGS. 1-3.

Needle 20 has a cone 24 extended from a cylindrical base 26 which is sealed 28 in the bore 16 of valve body 12. A valve seat 50 is provided in the valve body 12. FIG. 4 shows the needle cone 24 sealed in and sealing the valve seat 50, closing the valve 10. FIG. 5 shows cone 24 metering refrigerant 52 between the valve seat 50 and the cone 24. FIG. 5 shows orifices 60 being partially opened in a metering position of cone 24.

FIG. 6 shows orifices 60 fully opened. Each of the fully opened orifices 60 has an area equal to an area of each of the connectors 40. A stepper motor 72 and screw 74 drive 70 the needle 20.

Figure 7:
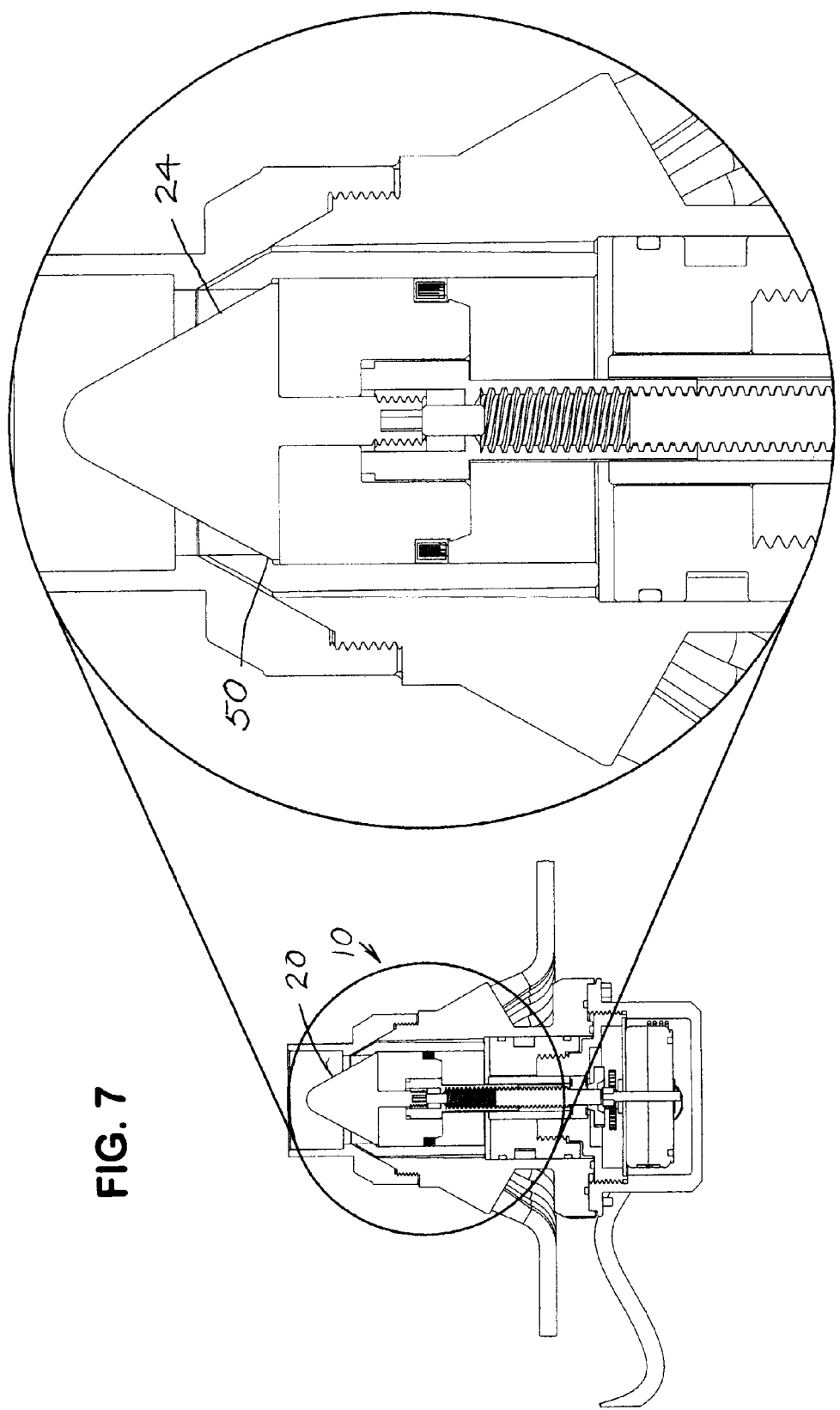
FIGS. 7 and 8 are details of closed and metering positions of the valve shown in FIGS. 4-6.
Figure 8:
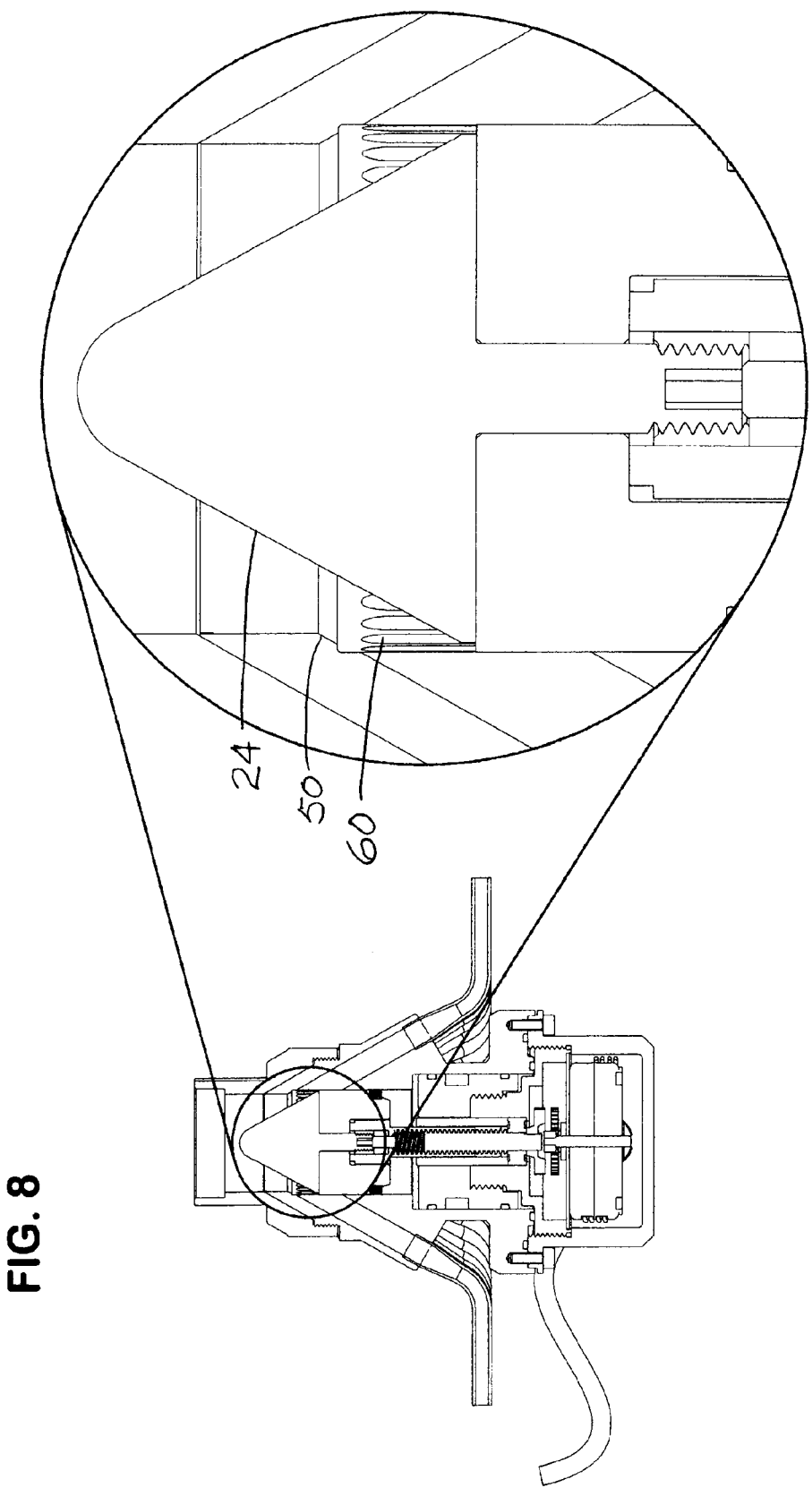
Figure 13:
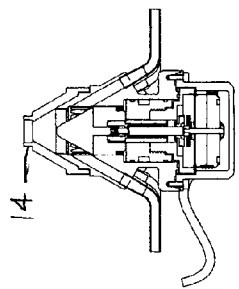
FIGS. 9-13 show the same valves connected to different size refrigerant pipe headers.
Figure 12:
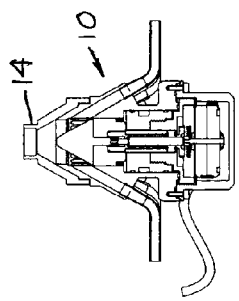
Figure 11:
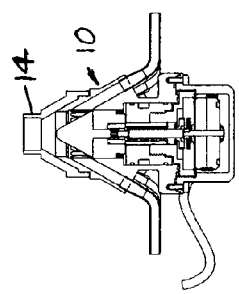
Figure 10:
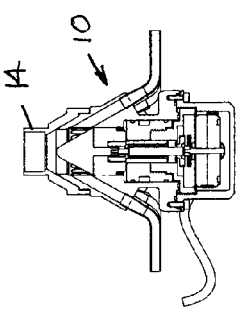
Figure 9:
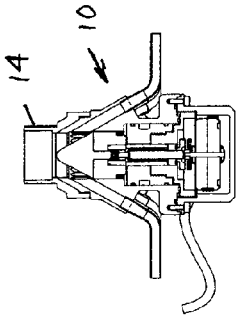

FIGS. 7 and 8 are details of closed and metering positions of the valve shown in FIGS. 4-6. FIG. 8 shows the relatively wide orifices 60.

FIGS. 9-13 show the same valves connected to different size refrigerant pipe headers.

Figure 14:
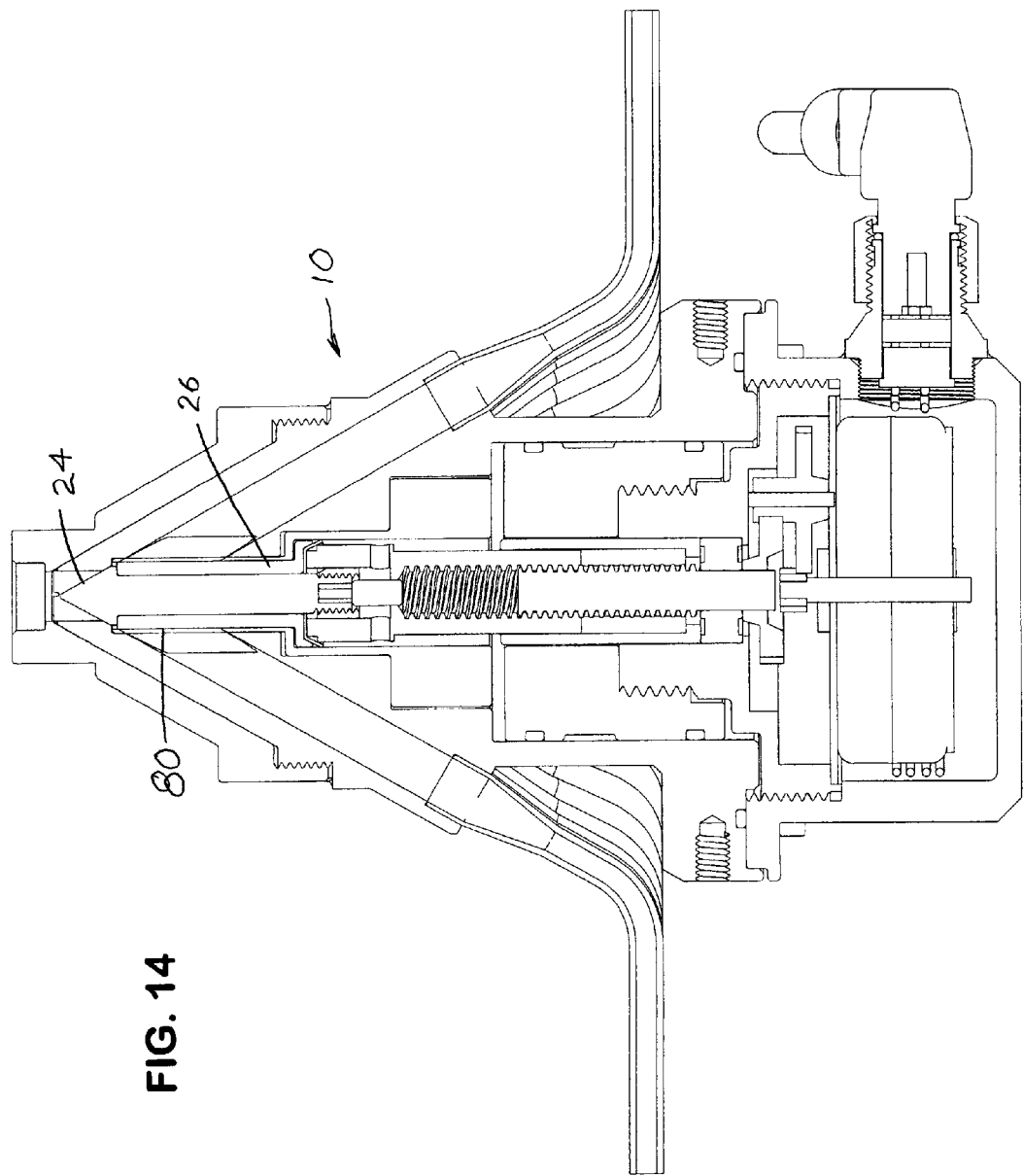
FIGS. 14-16 are closed, metering and fully open cross-sectional views of a non phase change liquid control valve.

FIG. 14 shows the at least one equalizing channel 80 within valve body 10. Channel 80 equalizes pressure above cone 24 and below base 26 when the cone is moved away from a seal with valve seat 50.

Figure 15:
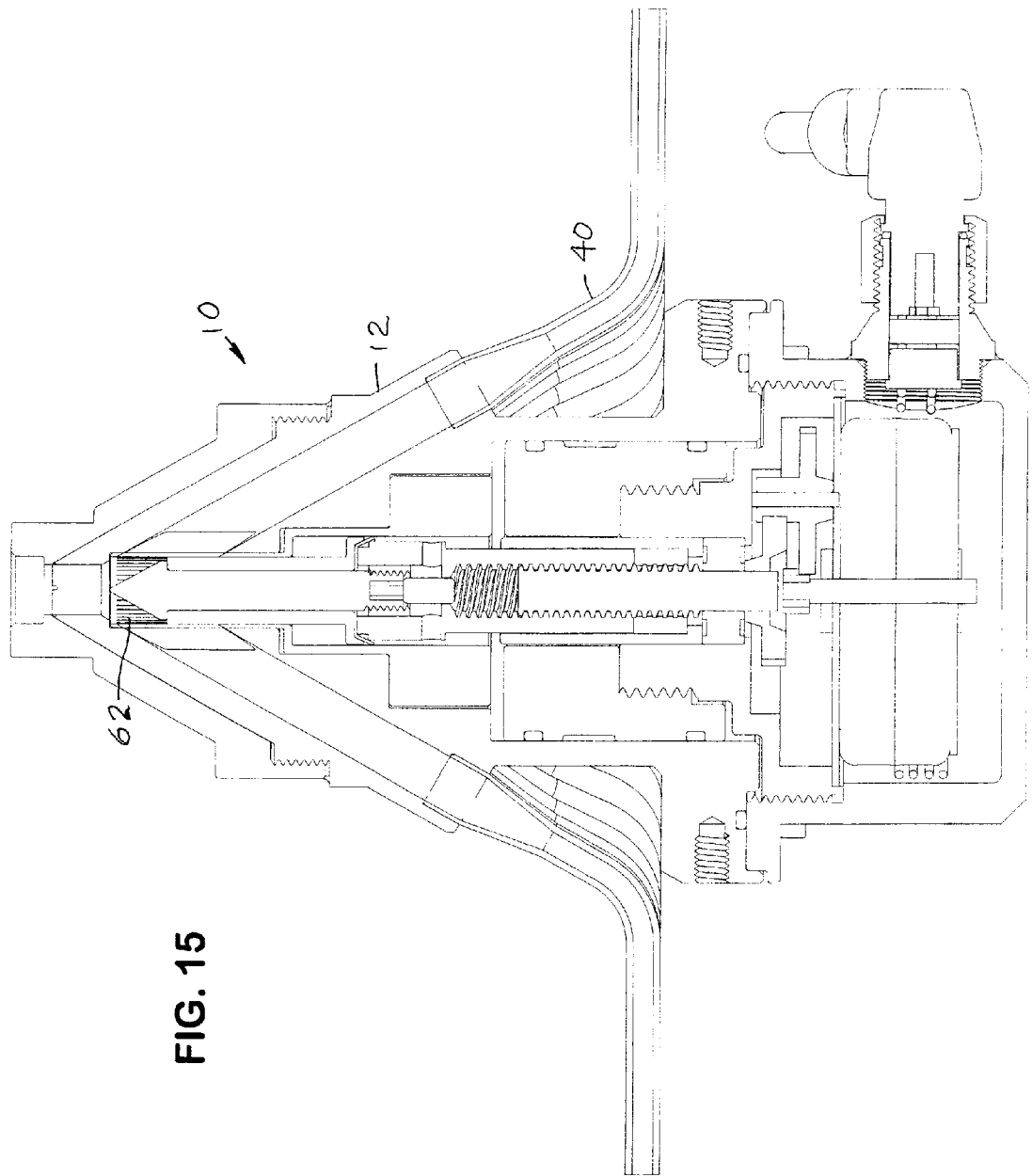
Figure 16:
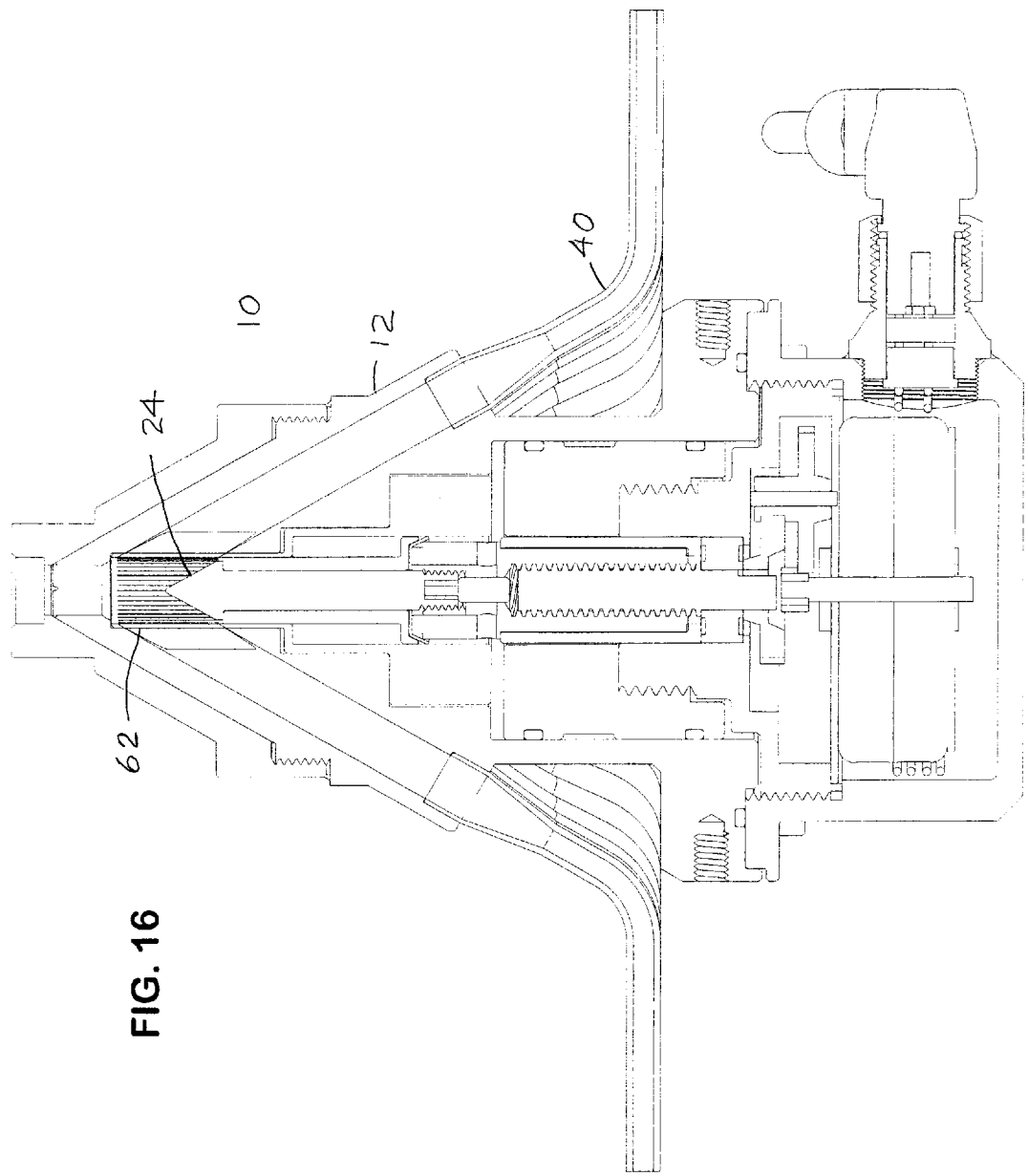

FIGS. 15 and 16 show narrow orifices 62 used for liquid in valves 10 at outlets of condensers and inlets of evaporators and shows connectors 40 added and braised on the valve body 12.

Figure 17:
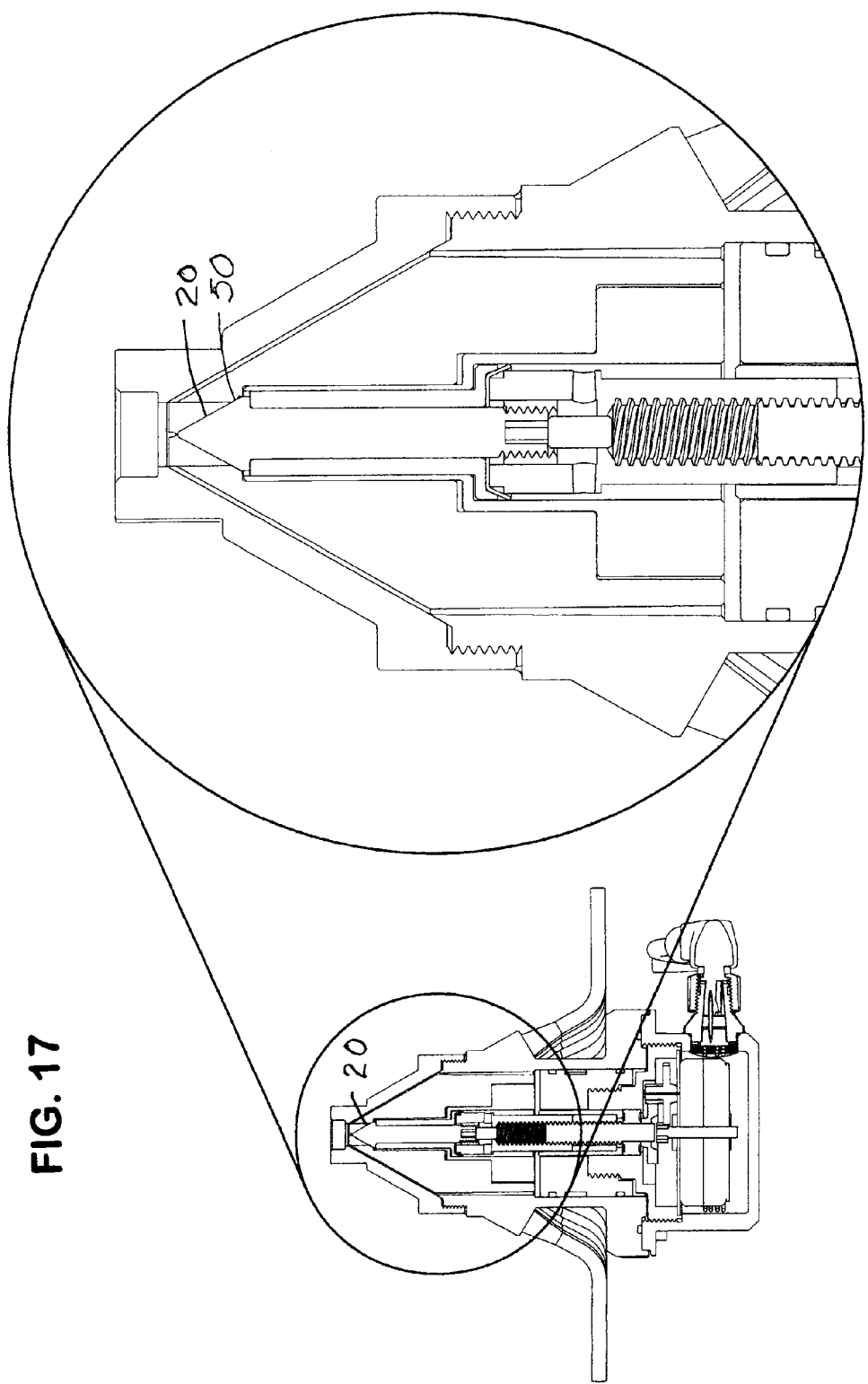
FIGS. 17 and 18 are details of the liquid control valve in closed and fully opened positions.
Figure 18:
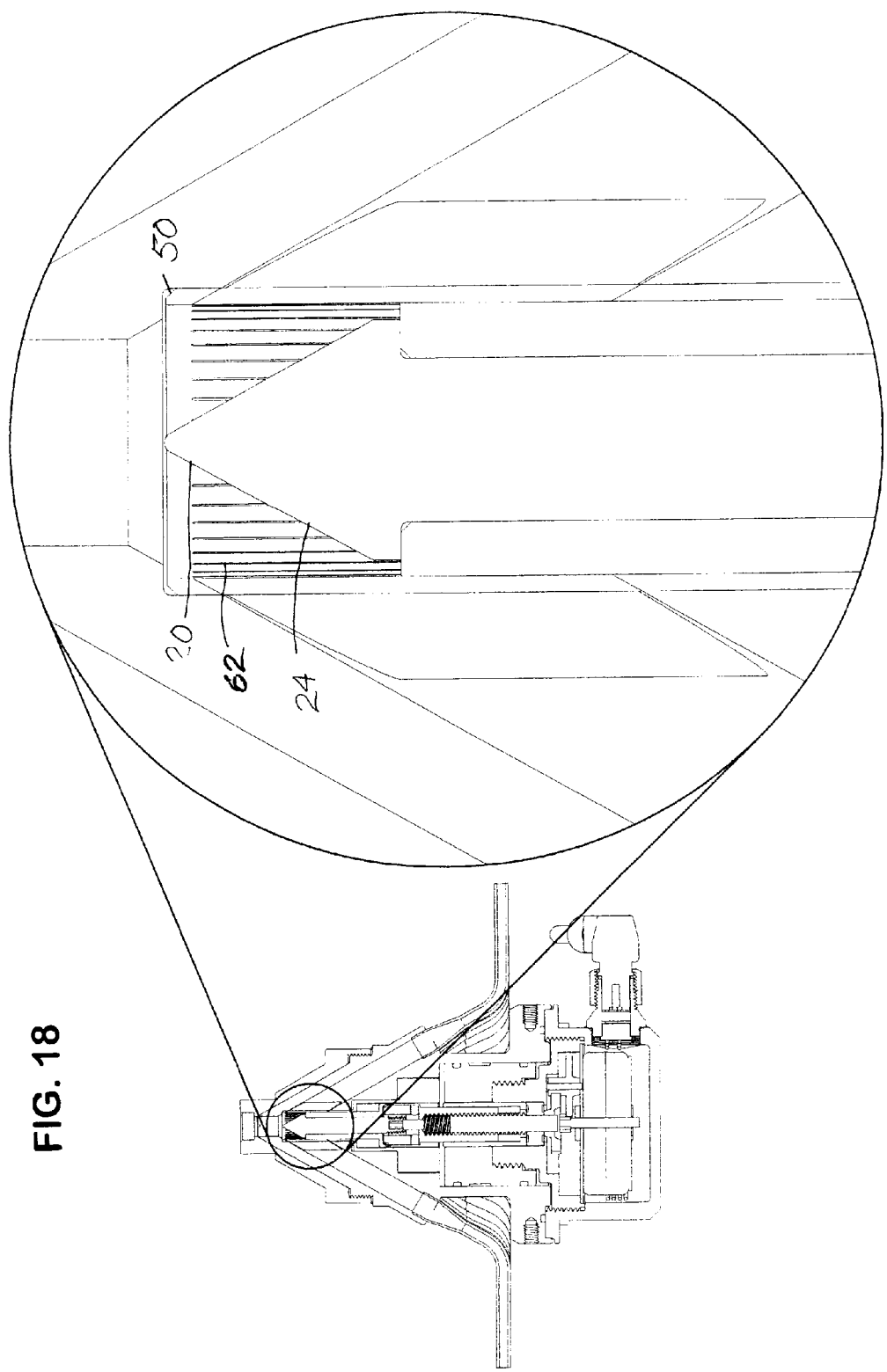

FIGS. 17 and 18 respectively show details of needle 20 in sealing and metering positions.

Figure 19:
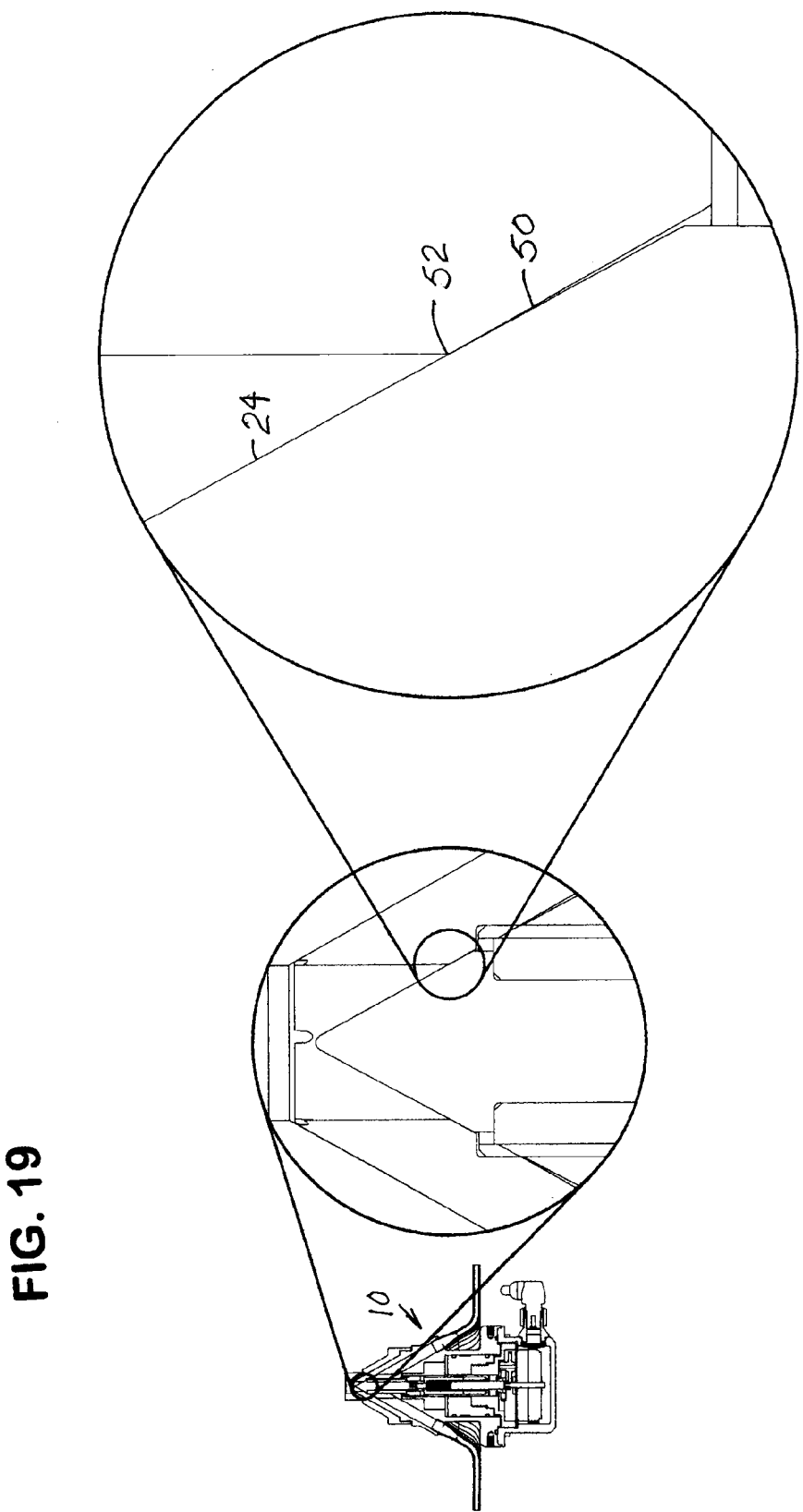
FIG. 19 is a detail of the closed position of first metering parts of the valve with angle surface differentiation for sealing purposes.

FIG. 19 shows an enlarged detail of valve seat 50 having an upper edge 52 against which cone 24 of needle 20 is seated and sealed. The cone 24 and valve seat 50 have slightly distinct slopes to assure sealing on one sealing edge.

Figure 20:
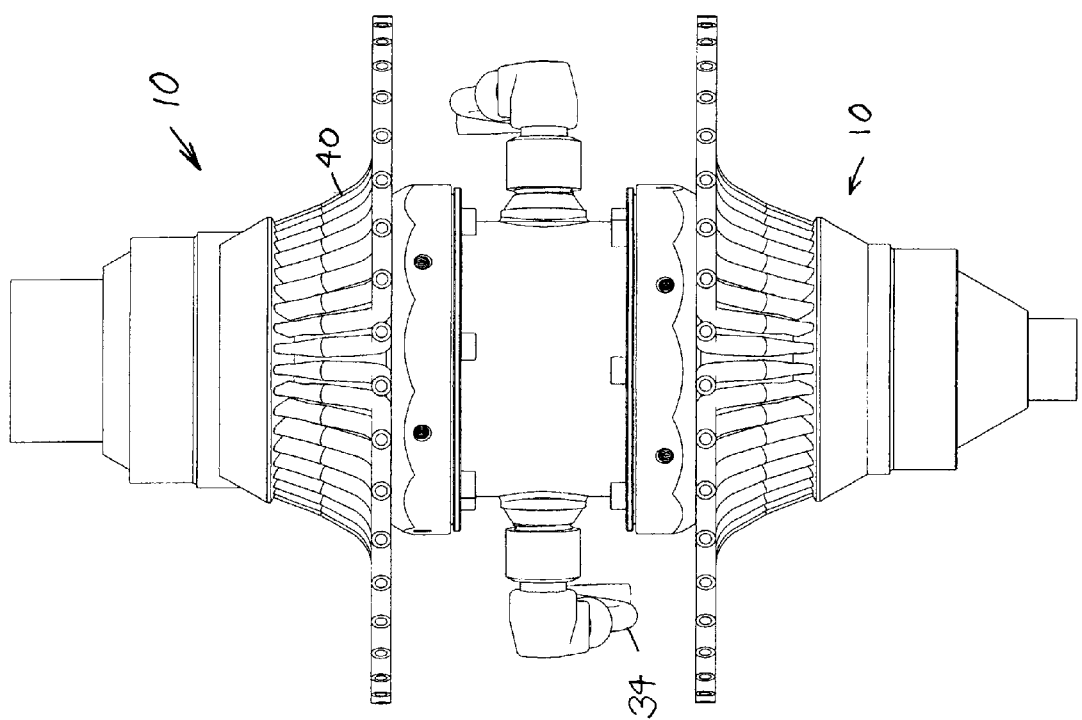
FIG. 20 shows back-to-back refrigerant control valves.

FIG. 20 shows back-to-back mounted valves 10 which may be used in a dead zone of a heat exchanger. One valve controls inlet refrigerant, and the other valve controls the outlet of refrigerant from connected individual hairpin-shaped heat transfer circuits.

While the invention has been described with reference to specific embodiments, modifications and variations of the invention may be constructed without departing from the scope of the invention, which is defined in the following claims.

I claim:

1. Apparatus comprising:
a refrigerant control valve further comprising
a valve body having a bore,
a refrigerant pipe header on a first longitudinal end of the valve body,
a first metering conical valve seat in the valve body,
a plurality of axially elongated orifices extending through the valve body,
a needle in the valve body,
a drive mounted in a second end of the valve body and connected to the needle for moving the needle axially in the valve body,
wherein the needle is adapted for contacting the first metering valve seat for sealing the valve body and moving away from the valve seat for metering refrigerant flow through a first metering valve between the needle and the valve seat,
the needle moving in the bore along the axially elongated orifices for selectively partially opening the orifices for a second metering of the refrigerant flowing through the orifices, and for fully opening the orifices, wherein the valve seat and the needle have distinct slopes for sealing the valve seat with the needle at one longitudinal end of the valve seat, wherein the needle further comprises a cone and a base, and wherein the cone contacts an upper end of the valve seat for closing the refrigerant control valve and the base seals the orifices, further comprising at least one equalizing longitudinal channel in the valve body extending from below the upper end of the valve seat to below the base for equalizing pressure of refrigerant above and below the cone when the cone moves away from the valve seat.

2. The apparatus of claim 1, wherein the axially elongated orifices are wide with respect to longitudinal surfaces of the valve body between the longitudinal orifices for controlling flow of refrigerant through the orifices.

3. The apparatus of claim 2, wherein the valve body has longitudinally extending wall spaces between the wide orifices, and wherein the wall spaces are thinner than the long and wide orifices.

4. The apparatus of claim 1, wherein the axially elongated orifices are narrow with respect to longitudinal surfaces of the valve body between the axially elongated orifices for controlling flow of liquid refrigerant through the thin and narrow orifices.

5. The apparatus of claim 4, wherein the valve body has longitudinally extending wall spaces between the narrow orifices, and wherein the wall spaces are wider than the thin and narrow orifices.

6. The apparatus of claim 1, wherein the orifices number 20 or more.

7. The apparatus of claim 6, wherein the orifices are of a number greater than 20 or more.

8. The apparatus of claim 6, wherein the orifices are of a number greater than 30 or more.

9. The apparatus of claim 6, wherein the orifices are of a number greater than 40 or more.

10. Apparatus comprising:
a refrigerant control valve further comprising
a valve body having a bore,
a refrigerant pipe header on a first longitudinal end of the valve body,
a first metering conical valve seat in the valve body,
a plurality of axially elongated orifices extending through the valve body,
a needle in the valve body,
a drive mounted in a second end of the valve body and connected to the needle for moving the needle axially in the valve body,
wherein the needle is adapted for contacting the first metering valve seat for sealing the valve body and moving away from the valve seat for metering refrigerant flow through a first metering valve between the needle and the valve seat,
the needle moving in the bore along the axially elongated orifices for selectively partially opening the orifices for a second metering of the refrigerant flowing through the orifices, and for fully opening the orifices, further comprising connectors extending radially outward from the valve body for connecting the orifices to individual heat exchange circuits.

11. The apparatus of claim 10, wherein the connectors extend along the orifices and angularly away from the orifices to cross-sectional areas equal to cross-sectional areas of the orifices.

12. The apparatus of claim 10, wherein the valve seat and the needle have distinct slopes for sealing the valve seat with the needle at one longitudinal end of the valve seat.

13. The apparatus of claim 12, wherein the needle further comprises a cone and a base, and wherein the cone contacts an upper end of the valve seat for closing the refrigerant control valve and the base seals the orifices.

14. The apparatus of claim 13, further comprising at least one equalizing longitudinal channel in the valve body extending from below the upper end of the valve seat to below the base for equalizing pressure of refrigerant above and below the cone when the cone moves away from the valve seat.

* * * * *